J. E. ENDER, L. W. CROMPTON & W. C. BURGERT.
CAMERA.
APPLICATION FILED MAR. 1, 1916.
1,271,685.
Patented July 9, 1918.
2 SHEETS—SHEET 1.
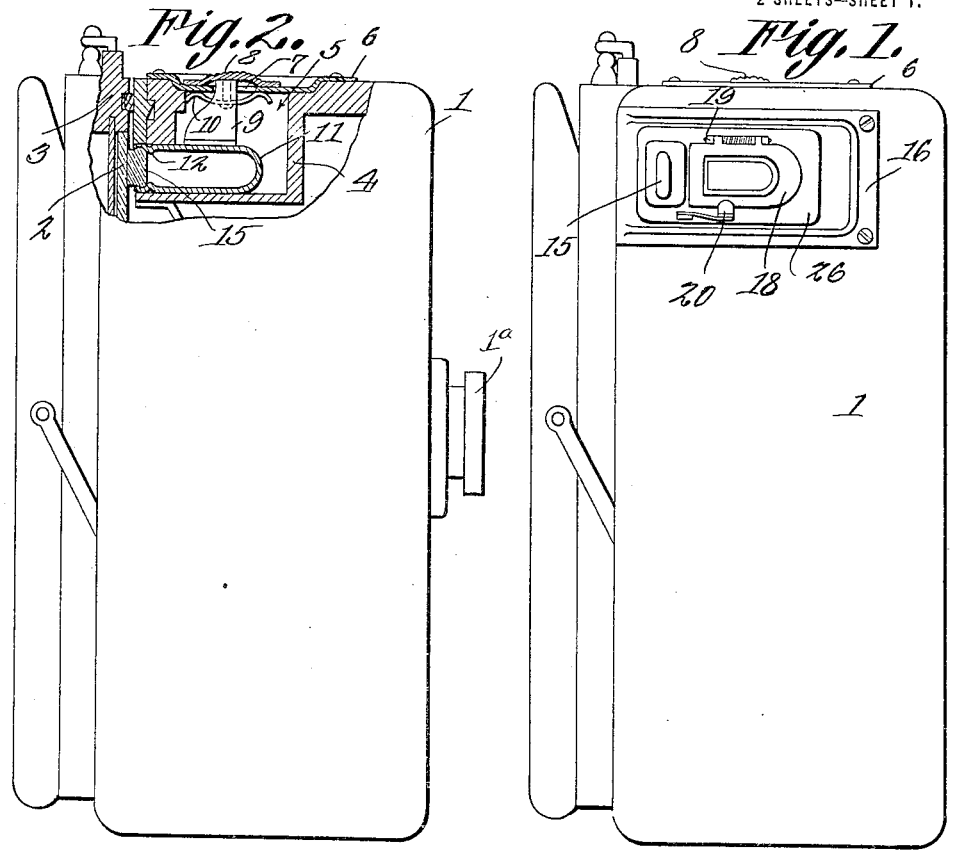
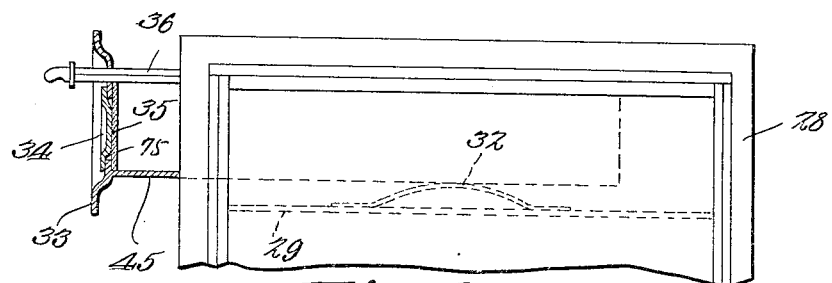
Fig. 5.
Witnesses
J. E. Ender
L. W. Crompton and
W. C. Burgert
Inventors,
by C. A. Snow & Co.
Attorneys.

J. E. ENDER, L. W. CROMPTON & W. C. BURGERT.
CAMERA.
APPLICATION FILED MAR. 1, 1916.
1,271,685.
Patented July 9, 1918.
2 SHEETS—SHEET 2.
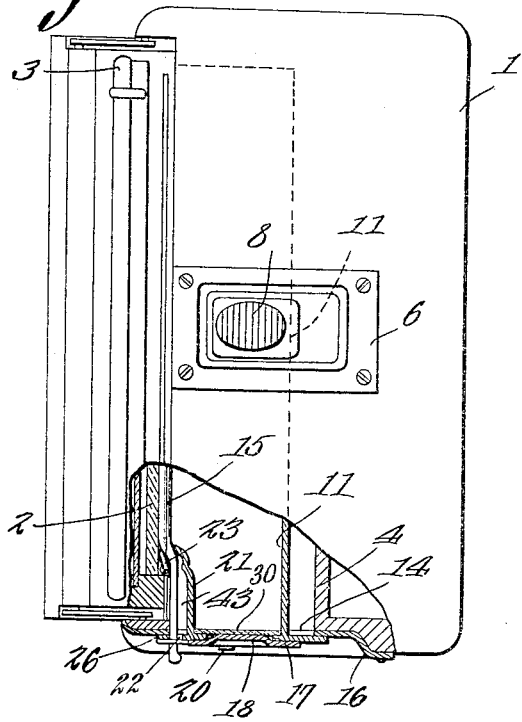
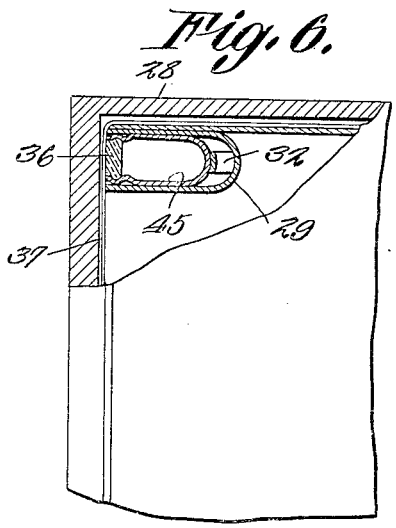
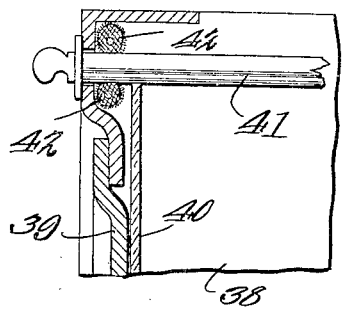
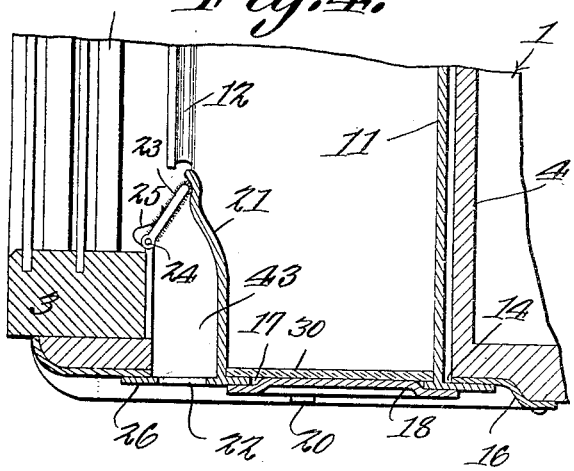
J. E. Ender
L. W. Crompton and
W. C. Burgert
Inventors,
Witnesses
by C. A. Snow & Co.,
Attorneys.

UNITED STATES PATENT OFFICE.

JAMES E. ENDER, LIONEL W. CROMPTON, AND WILLARD C. BURGERT, OF TAMPA, FLORIDA.

CAMERA.

1,271,685.  Specification of Letters Patent.  Patented July 9, 1918.

Application filed March 1, 1916. Serial No. 81,490.

*To all whom it may concern:*

Be it known that we, JAMES E. ENDER, LIONEL W. CROMPTON, and WILLARD C. BURGERT, citizens of the United States, residing at Tampa, in the county of Hillsborough, State of Florida, have invented a new and useful Camera, of which the following is a specification.

It is the object of this invention to provide novel means whereby an inscription may be made on a sensitized member in a camera.

The invention aims, further, to provide novel means for mounting in the camera, a slide upon which an inscription may be written, novel means being provided for admitting light on the slide, so that the inscription on the slide may be reproduced on the sensitized member.
A further object of the invention is to provide novel means for moving the tube which admits light to the slide, relative to the sensitized member, whereby the slide which carries an inscription and in turn is carried by the tube may be positioned properly with respect to the sensitized member.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a camera equipped with the device forming the subject matter of this application;
Fig. 2 is a side elevation of the structure shown in Fig. 1, parts being broken away;

Fig. 3 is a top plan of the camera shown in Figs. 1 and 2, parts being broken away;

Fig. 4 is a sectional detail enlarged from Fig. 3;

Fig. 5 is a sectional top plan, disclosing a modified form of the invention;

Fig. 6 is a side elevation of the device shown in Fig. 5, parts being broken away and parts appearing in section;

Fig. 7 is a sectional detail illustrating another modification in the invention.

In the drawings, and referring particularly to Figs. 1, 2, 3 and 4, there is shown a camera 1 carrying a sensitized member 2 held in place on the camera 1 by any suitable means indicated at 3. The numeral 1ª indicates conventionally, any means for exposing the sensitized member 2. The camera 1 may be of any desired form, and the sensitized member may be a plate or a film. The showing of the drawings, therefore, may be taken as diagrammatic, to a considerable extent, so far as the member 2 and its mounting 3 is concerned, since the novelty does not lie essentially in this portion of the device, and since the structure hereinafter described may be mounted on cameras of widely different sorts.

In the present embodiment of the invention, a compartment 4 extends transversely of the camera near its top and at its rear end, the compartment 4 opening through one side of the camera as shown at 14. In the top of the camera there is fashioned an opening 5 which communicates with the compartment 4 intermediate the ends of the compartment. Bridging the opening 5 in the top of the camera is a plate 6 having a slot 7. A button 8 is mounted to reciprocate on top of the plate 6 and is provided with a depending neck 9 passing through the slot 7. Attached to the neck 9 and bearing against the bottom of the plate 6 is a bowed spring 10. The lower end of the neck 9 is attached to a tube 11, located in the compartment 4, the tube 11 constituting a light admitting passage. The tube 11 is open at its rear edge and is there provided with guides 12 adapted to receive a slide 15. The slide 15 is made of ground glass or some other substance which, although permitting the passage of light, is adapted to receive an inscription made by a pencil, pen or otherwise.

Secured to one end of the tube 11 is a plate 26 mounted to slide on a plate 16 attached to the slide of the camera, the plate 16 having an opening 14 through which the tube 11 passes. In the plate 26 which is attached to the end of the tube 11 there is formed an opening 17 closed by a door 18 which may be connected to the plate 26 by means of a spring hinge 19, a latch 20 on the plate 26 being provided, if desired for maintaining the door 18 in a closed position.

Projecting from the plate 26 and located near to the guides 12 is a short partition 21. The partition 21 defines a compartment 43 closed by a shutter 23 pivoted as shown at 24, to some accessible part of the camera, or otherwise supported, a spring 25 being provided for holding the shutter 23 in a closed position. The shutter 23 ordinarily is covered with felt, velvet or some other material adapted to exclude light.

In practical operation, an inscription is written or placed otherwise on the slide 15, the slide being introduced through an opening 22 in the plate 26 and through the compartment 43 into the guides 12, the shutter 23 yielding to permit such an operation. Then, through the instrumentality of the button 8, the tube 11 may be advanced until the slide 15 is disposed close to the sensitized member 2. The door 18 may be swung to an open position, admitting light to the tube 11, the light being properly diffused within the tube 11 by means of a plate of ground glass, indicated at 30 and located at the mouth of the tube, the interior of the tube preferably being polished. The light thus admitted to the tube 11 will pass through the slide 15, and the inscription on the slide will be reproduced on the sensitized member 2.

As shown in Figs. 5 and 6 there appears a camera 28 carrying a tube 29 corresponding to the compartment 4. A tube 45 is adapted to be slid endwise into the tube 29, the tube 45 corresponding to the tube 11 of Figs. 1 and 2. The tube 45 is provided with an end cap 33 having an opening 35 controlled by a door 34 of the sort hereinbefore described, the numeral 36 indicating the slide which carries the inscription as hereinbefore set forth. The numeral 75 indicates a piece of frosted glass or the like, located at the outer end of the tube 45 and adapted to diffuse the light therein. The sensitized element appears at 37 and the numeral 32 indicates a spring which, being attached to the tube 45, bears against the rear wall of the tube 29 and holds the slide 36 in contact with or close to the sensitized element 37.

In Fig. 7, there appears a portion of a tube 38 corresponding to the tube 11. The door appears at 39, the light diffusing member is shown 40 and the inscription slide appears at 41. This detail is described for the purpose of illustrating that, if desired, opposed resilient closure members 42 covered with felt or velvet, may coöperate with the inscription slide 41 and replace the shutter 23 of Fig. 4.

Having thus described the invention, what is claimed is:—

In a device of the class described, a camera having a transverse compartment which is open at one end, and having an opening communicating with the compartment; means for holding a sensitized element in position for exposure in the camera; a plate bridging the opening and carried by the camera, the plate having a slot; a button mounted to reciprocate on the outer surface of the plate and having a projecting neck movable in the slot and extended into the compartment; a bowed spring attached to the neck and bearing against the inside of the plate; a tube secured to the neck and movable in the compartment, the tube having guides; an inscription slide mounted in the guides and coacting with the sensitized element in the camera; a closure for said open end of the compartment and carried by the camera; a plate slidable on the closure and connected with the tube, the plate having an opening through which the slide may be inserted; and a movable shutter carried by the last specified plate and constituting means for admitting light into the tube.

In testimony that we claim the foregoing as our own, we have hereto affixed our signatures in the presence of two witnesses.

JAMES E. ENDER.
LIONEL W. CROMPTON.
WILLARD C. BURGERT.

Witnesses:
MARJORIE ELIOT,
W. RALEIGH PETTEWAY.

Copies of this patent may be obtained for five cents each, by addressing the "Commissioner of Patents, Washington, D. C."